E. T. HENDEE.
FRICTION CUTTING MACHINE.
APPLICATION FILED SEPT. 18, 1913.
1,185,095.
Patented May 30, 1916.
6 SHEETS—SHEET 6.
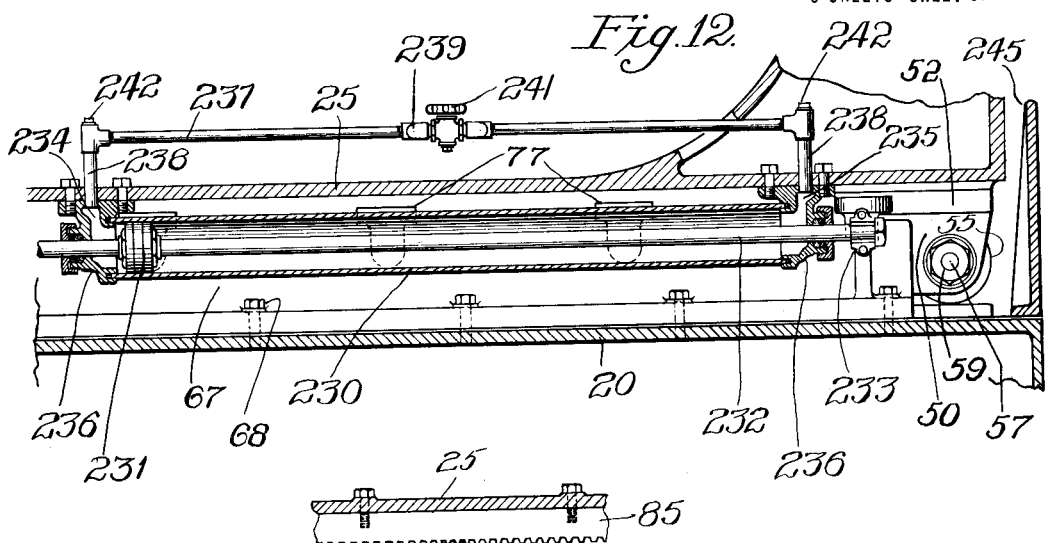
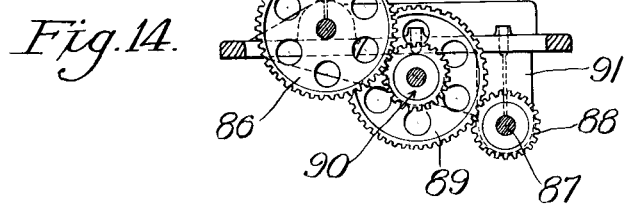
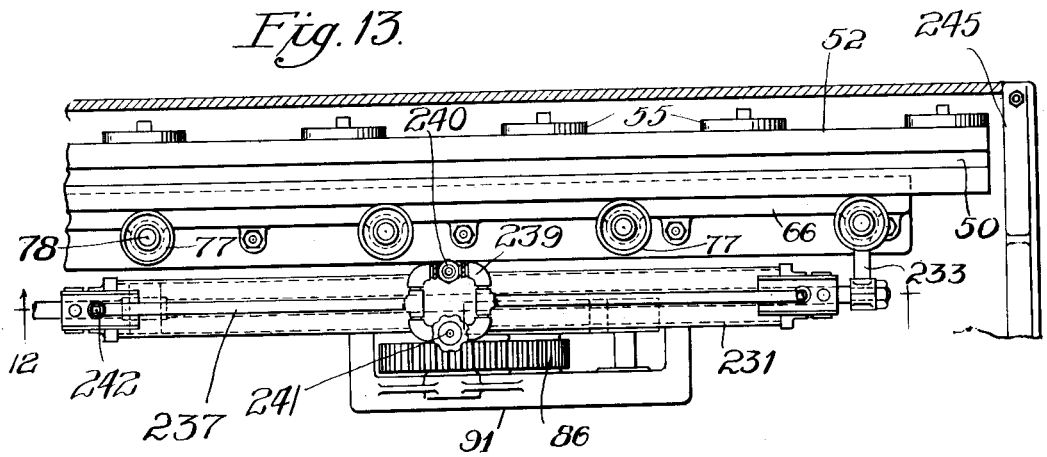
Witnesses:
Harry S. Gaither
J. E. Dowle.
Inventor:
Edward T. Hendee
by William W. Hall
Atty

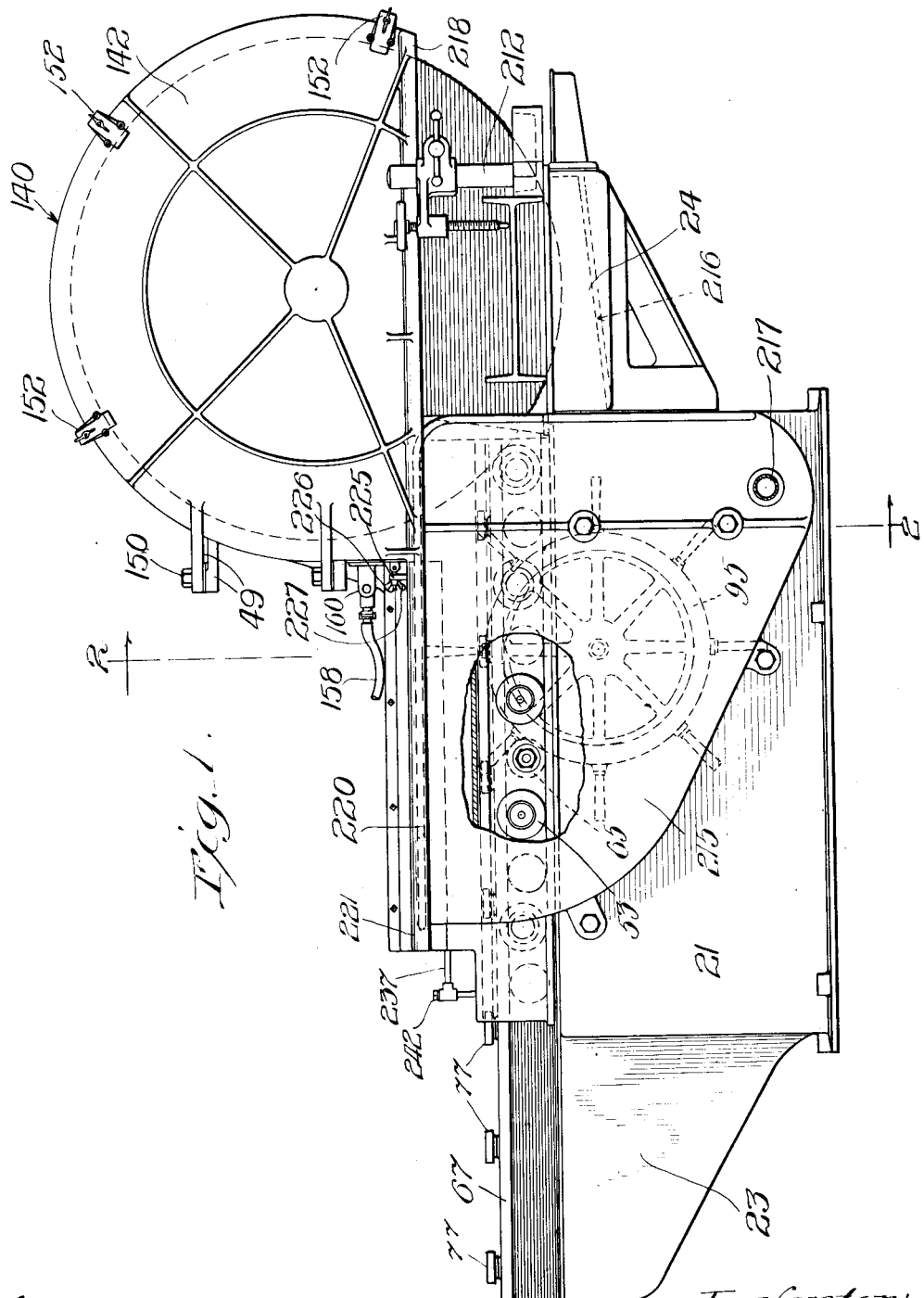

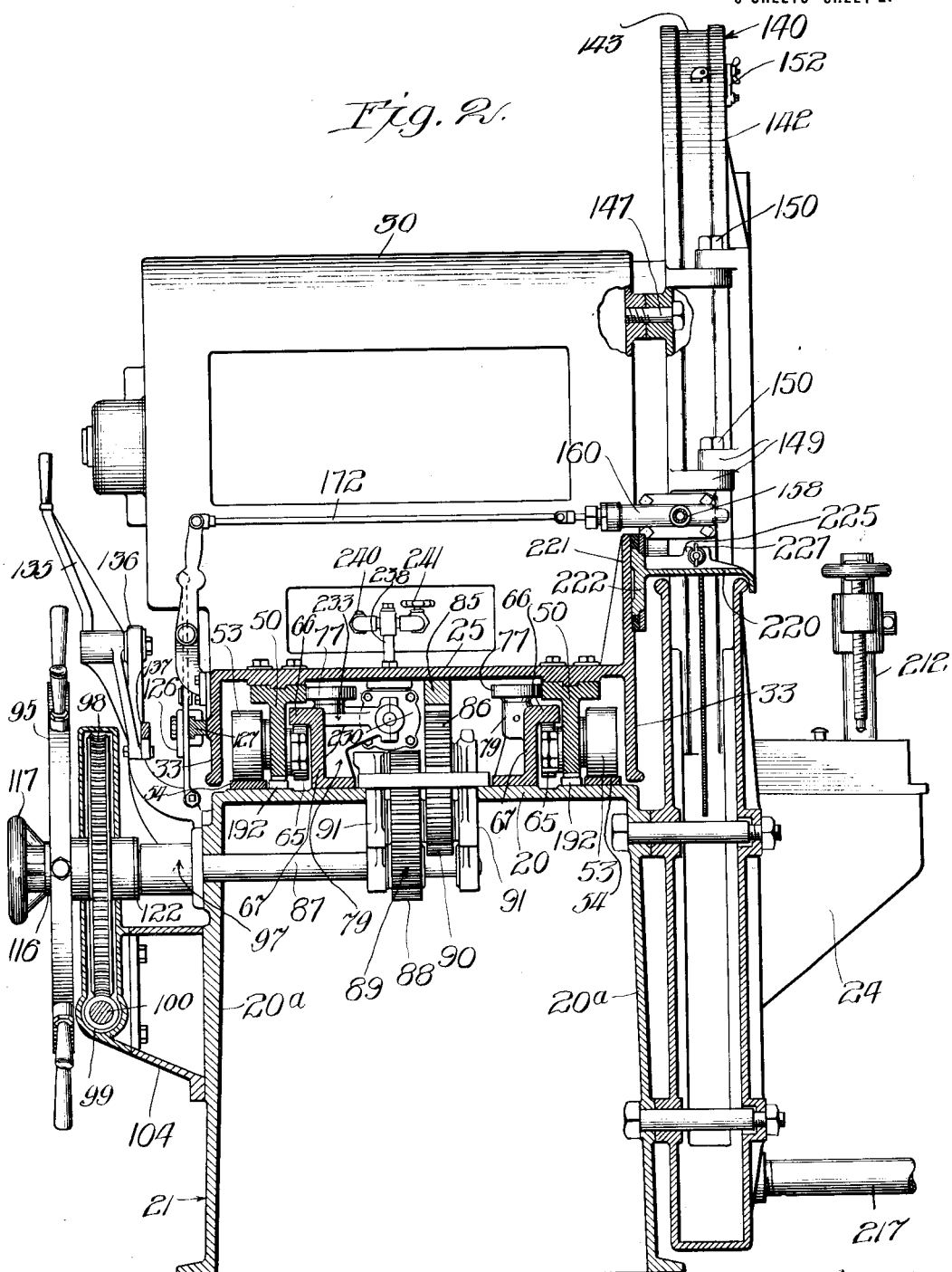

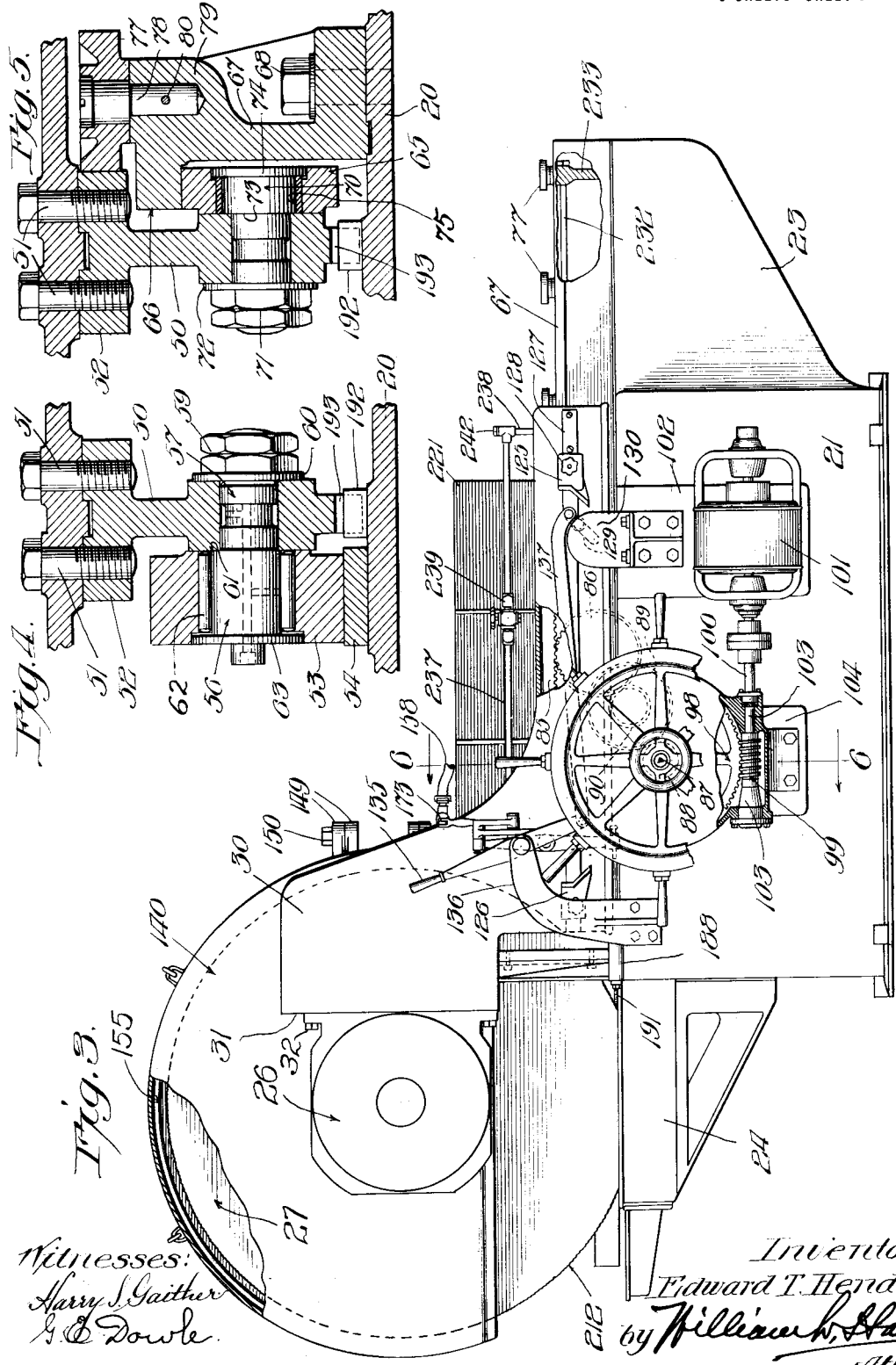

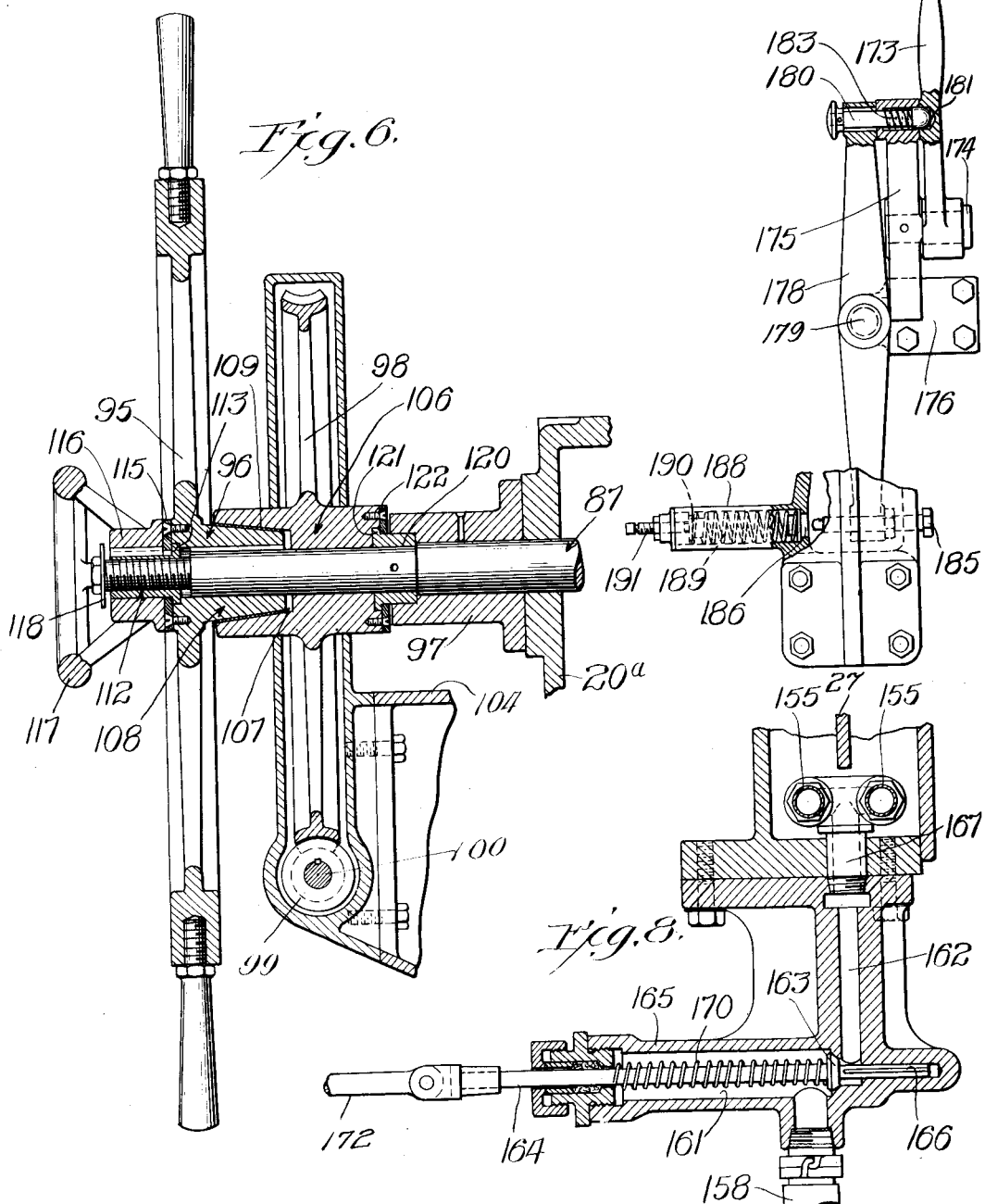

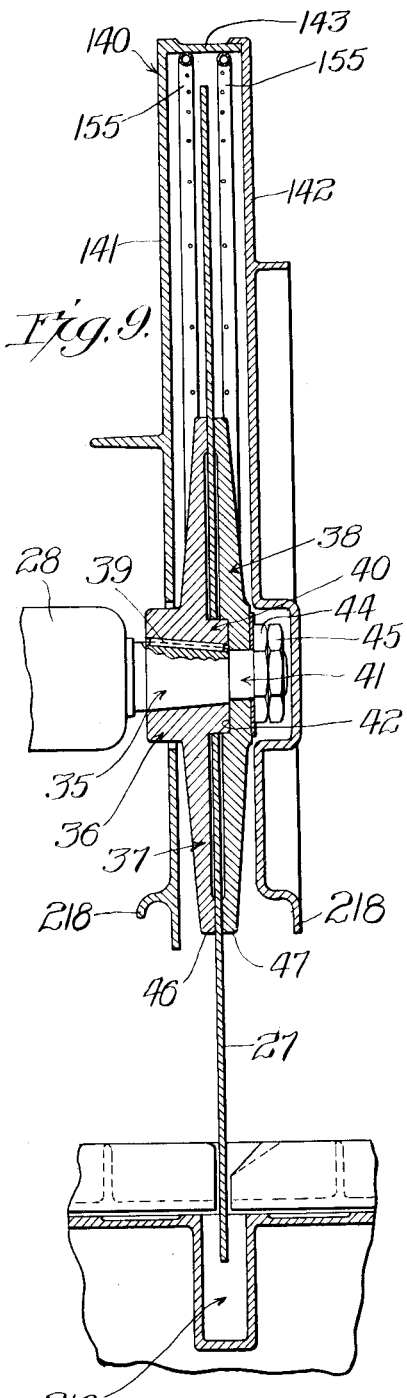
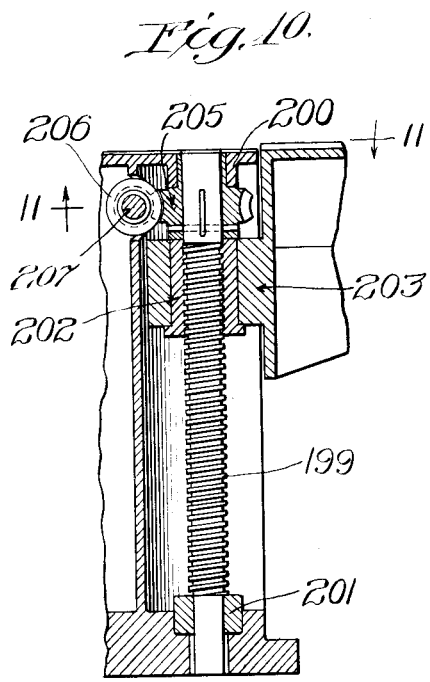
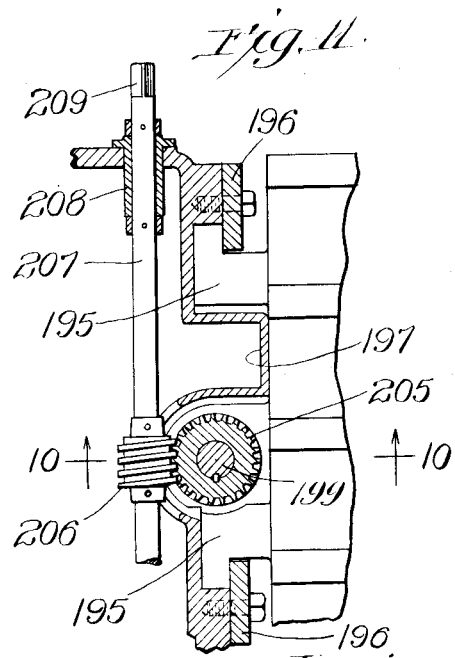

UNITED STATES PATENT OFFICE.

EDWARD T. HENDEE, OF CHICAGO, ILLINOIS.

FRICTION CUTTING-MACHINE.

1,185,095.  Specification of Letters Patent.  Patented May 30, 1916.

Application filed September 18, 1913. Serial No. 790,405.

*To all whom it may concern:*

Be it known that I, EDWARD T. HENDEE, a citizen of the United States, and a resident of Chicago, in the county of Cook and State of Illinois, have invented certain new and useful Improvements in Friction Cutting-Machines; and I do hereby declare that the following is a full, clear, and exact description thereof, reference being had to the accompanying drawings, and to the characters of reference marked thereon, which form a part of this specification.

This invention relates to improvements in friction cutting machines for rapidly cutting plates, bars and shapes by engagement of a high speed cutting disk with the work.

The present invention is, in some of its phases, an improvement on the friction cutting machine shown in the prior U. S. Letters Patent to Fergusson, No. 1,004,539, dated September 26, 1911.

Among the objects of the invention is to provide a novel combined hand and power feed by which to urge the cutting element or disk through the work, so constructed and arranged that the power and hand feed mechanisms may be independently used, or to permit the hand or manual feed mechanism to be operated in conjunction with the power feed mechanism.

A further object of the invention is to provide a novel means of mounting the motor and the saw arbor on the reciprocating carriage of the machine, so as to thereby simplify the machine and adapt it to larger dimensions of work, without correspondingly increasing the diameter of the cutting disk.

Another object of the invention is to provide, in combination with a carriage provided at its front end with a forwardly facing motor supporting face, means for directly and fixedly attaching the motor to said face in such manner as to avoid vibration and consequent loosening of the motor mounting and to also prevent vibration of the cutting disk which is directly connected to the motor; and in connection with this construction, the object of the invention to provide a large work clearance above the work is attained.

Another object of the invention is to provide novel means of attaching the friction saw or like cutting element to its arbor and for supporting the saw so as to give radial support to the saw and to avoid, to a maximum extent, vibrations of the saw in its plane and consequently buckling of the saw.

Another object of the invention is to provide a novel roller bearing between the saw carriage and the stationary frame of the machine, so arranged as to maintain the carriage and, therefore, the saw carried thereby, in accurate alinement, and also arranged to permit adjustment of the bearing rollers on occasion of wearing of the rollers or the surfaces with which they contact.

A further object of the invention is to provide novel means for applying a cooling fluid, as water, to the saw blade during the cutting operation, so constructed as to automatically cut off the supply of cooling fluid at the limit of the cutting operation of the machine.

Another object of the invention is to provide means for steadying the feed travel of the saw carriage, so as to thereby avoid abrupt or jerky feed movements of the saw when it is passing through the work of varying resistances.

Other and further objects of the invention are to improve, simplify and render more efficient machines of this general character, and the invention consists in the matters hereinafter set forth and more particularly set forth in the appended claims.

In the drawings I have illustrated one practical embodiment of the invention, but it will be understood that the structural details of such embodiment hereinafter specifically described are capable of variations within the spirit and scope of the invention, and the detailed description of the structure illustrated is not intended in any manner as limiting the invention defined in the append claims beyond that which is imposed by the prior art.

In the drawings:—Figure 1 is an elevation of the left hand side of a friction sawing machine embodying my invention, with party broken away. Fig. 2 is a transverse section on the line 2—2 of Fig. 1. Fig. 3 is an elevation of the right hand side of the machine, with parts broken away. Figs. 4 and 5 are detail sectional views of the antifriction bearing elements between the saw carriage and the fixed frame of the machine. Fig. 6 is a fragmentary sectional view of the general line 6—6 of Fig. 3, illustrating the combined power and hand feed mechanisms for the saw. Fig. 7 is a fragmentary view, with parts broken away, of a portion of the automatic cooling water control mechanism. Fig. 8 is a fragmentary view of a portion of said mechanism. Fig. 9 is an axial section taken through the friction saw and its protecting inclosing hood, showing the manner of mounting the saw on its arbor. Fig. 10 is a vertical sectional view on the line 10—10 of Fig. 11, showing the mechanism for raising and lowering the work table. Fig. 11 is a horizontal section thereof on the line 11—11 of Fig. 10. Fig. 12 is a partial vertical section of the carriage, showing an oil check arrangement for steadying the feed travel of the carriage. Fig. 13 is a top plan view of the parts shown in Fig. 12. Fig. 14 is a detail illustrating the reducing gear mechanism between the feed shaft and the rack of the saw carriage.

As shown in the drawings, 20 designates the fixed horizontal bed plate or frame of the machine which is mounted upon or is made part of a hollow, cast metal frame 21. Said frame is provided at its rear end with an extension 23, and at its front end with a work table designated, as a whole, by 24. Mounted on said bed plate is a carriage 25 which is reciprocable endwise of the bed plate and which carries at its forward end a motor 26, and a cutting disk 27. Said disk is mounted directly upon the shaft 28 of the motor, in a manner to be hereinafter described, the motor shaft constituting the arbor of the cutting disk.

In accordance with my invention the traveling carriage is formed at its forward end with means to support the motor in a manner to overhang the support on which the work rests while being cut (which work support may be a unitary part of the machine or removably associated therewith) so as to give clearance for the work substantially to the bottom of the motor. As herein shown, the carriage is provided with an upstanding portion or bracket 30 of relatively massive structure, formed with a flat, vertical front face 31 upon which the motor is mounted in the manner of a wall mounting. By reference to Fig. 3 it will be noted that the motor casing has a deep vertical bearing with the flat wall of the part 30 of the carriage and said bearing extends in width from end to end of said upstanding part of the carriage. The motor casing is attached to the carriage by bolts 32 which extend through the flanged back end of the motor casing both above and below the plane of the axis of the motor shaft and into the carriage. Thus the motor is directly and fixedly attached to the carriage to support its overhanging weight and to support the mounting from racking under working stress. The reliability of the rigid attachment thus afforded insures perfect alinement of the cutting disk, and further insures against vibration, due to movement of the motor and disk relatively to the carriage. This construction provides an exceedingly rigid mounting for the motor on the traveling carriage, and such or analogous mounting also greatly increases the clearance between the top of the work table 24 and the motor, as compared to constructions where the motor is supported on a horizontal elongation of the carriage, without increasing the diameter of the disk and the vertical dimensions of the machine. It is of great practical importance to keep the diameter of the disk down to a minimum while adapting it to operate on practically maximum dimensions of work, inasmuch as a very small increase of diameter of the cutting disk greatly increases the power necessary to drive it. Thus it will be seen from an inspection of Fig. 3 that work of practically the vertical dimensions between the work table and the motor casing may be operated upon.

The work table or support is grooved to receive the disk, as indicated in dotted lines in Fig. 1 and in full lines in Fig. 9. The carriage 25 is shaped at its side edges to provide depending aprons 33 which extend almost to the bed plate and inclose the bearings (hereinafter described) between the bed plate and the carriage.

In accordance with my invention the motor shaft 28 is made of large diameter so as to properly support the high speed disk and avoid vibrations of the latter in its plane. Further, the said shaft or arbor 28 is provided at its extreme disk supporting end with a reduced tapered portion 35, (Fig. 9) to receive the internally tapered hub 36 of the cutting disk clamping plate 37, between which and the coöperating clamping plate 38 the disk 27 is clamped. The said hub 36 of the inner clamping plate 37 is shown as made of approximately the length of the tapered reduced portion of the disk arbor and is fitted non-rotatively on the tapered portion, as through the medium of the key 39 engaging key-ways in said tapered portion of the arbor and the internally tapered portion of the hub. The said hub extends outwardly beyond the plane of the cutting disk to form a circular extension 40 which fits snugly in the central opening of the disk. The outer clamping plate 38 is provided with a central opening which snugly fits over the cylindric reduced portion 41 of the arbor exterior to the tapered portion 35 thereof, and said outer clamping plate is formed on its inner face with a socket 42 to fit over the extension 40. The said plates are clamped upon the disk by the nut 44 screw-threaded to the outer end of the arbor and locked in place by the lock nut 45. The said clamping members are made of a diameter, relatively to the cutting disk, to support the disk a substantial distance from the axis thereof, it being practical to make said plates of substantially the diametric dimensions of the motor casing. As a further improvement the said clamping members are provided near their peripheries with relatively thick engaging portions or ribs 46, 47 herein shown as formed by cutting away the members between said peripheries and the hubs of the clamping members, and said relatively thicker portions or ribs bear against the cutting disk at a substantial distance from the axis thereof, the clamping members being substantially out of contact with the disk between said ribs and hub portions of the members. The diameters of the plates 37, 38 are such, relatively to their thickness that said plates possess a substantial resilient flexibility, whereby they are adapted to be pressed into intimate clamping relation to the disk, regardless of slight original inaccuracies of fit. This construction is an advantageous one inasmuch as it reduces the work of finishing necessary to fit the clamping members to the cutting disk and insures a reliable support of the disk at a radial distance from the axis thereof, which could not be readily attained if the clamping members fitted flat to the cutting disk throughout the areas of the clamping members. Thus an exceedingly simple, compact and rigid connection is provided between the arbor and the cutting disk which prevents buckling of the disk under clamping pressure of the members and prevents vibration of the disk in its plane such as would unduly increase the width of the cut.

The carriage 25 is supported on the bed plate and the weight of the carriage and the parts carried thereby is transmitted to the bed plate through the medium of anti-friction roller bearing devices which are made as follows: 50, 50 designate rails arranged longitudinally of and attached to the under side of the carriage, being herein shown as detachably fixed thereto by the screw bolts 51 extending through the carriage and into the flanges 52 at the upper sides of the rails. 53, 53 designate vertical bearing rollers which travel on tracks 54 fixed to the bed plate 20. Said bearing rollers are rotatively mounted on horizontal stub shafts 56, the reduced portions 57 of which extend through openings in the rails 50 and are fixedly attached thereto, as by means of the nuts 59 screw threaded to the inner ends thereof, the nuts acting against washers 60 which co-act with shoulders between the larger and smaller diameters of the shafts to lock said shafts rigidly in place. Preferably anti-friction rollers, or other anti-friction bearing elements 62 are interposed between the bearing rollers 53 and the enlarged parts of said shafts, said anti-friction rollers being held from endwise displacement between the rails 50 and flanges 63 at the outer ends of said shafts which set into recessed portions of the bearing rollers.

In order to prevent the table from rising when the cutting disk strikes the work during the advance movement of the carriage, other vertical bearing rollers 65, carried by the rails 50, are provided which bear against downwardly facing tracks formed on the flanges 66 of downholding rails 67, of general Z shape, which are attached to the bed plate laterally inside of the rails 50, as by means of screw bolts 68. The said bearing rollers 65 are rotatively mounted on the enlarged portions 70 of horizontal stub shafts the reduced ends of which extend through and are fixed rigidly and detachably to the rails 50, as by means of nuts 71 screw-threaded to the reduced ends of the stub shafts. Said nuts act against washers 72 to force the shoulders 73 between the larger and smaller portion of said shafts against the rails 50, as more clearly shown in Fig. 5. As shown in said figure, hardened bearing rings 75 are interposed between the enlarged ends 70 of the stub shafts and bearing rollers 65, although, if desired other anti-friction elements may be applied. The said bearing rollers 65 are confined on the stub shafts 70 between the rails 50 and the flanges 74 at the inner ends of said shafts.

It will be noted that the carriage supporting rollers 53 and the downholding rollers 65 are arranged alternately along the rails 50 and that the supporting rollers are of larger diameter than the downholding rollers, as best shown in Figs. 1 and 2.

In order to hold the carriage from lateral displacement in its path of travel, horizontal bearing rollers 77 are provided which are rotatively mounted on vertical stub shafts 78, which latter extend downwardly into thickened portions 79 of the downholding rails 67 and are attached thereto in any suitable manner, as by the pins 80. The said rollers 77 bear against the inwardly facing portions of the flanges 52 of the rails 50, as best shown in Figs. 2 and 5. The flanged ends of the pins or stub shafts 78 hold the bearing rollers from rising.

As a further improvement the enlarged portions of the stub shafts on which the bearing rollers 53 and 65 and 77 are mounted are arranged eccentrically with respect to the reduced ends of the said shafts, so that by rotating the shafts in their bearings the said bearing rollers may be adjusted toward and from their bearing surfaces on the tracks 54 and rails 50 and 67. This adjustment may be made as a permanent adjustment when assembling the machine, or may be made after wear of the rollers or their coacting bearing surfaces to properly adjust the rollers to their bearing surfaces. For instance, the bearing rollers 53 and 65 may be adjusted to take up wear by loosening the holding nuts 59, 71 of their stub shafts, rotating the shafts on their axes, and thereafter tightening the holding nuts. The bearing rollers 77 are not subjected to such severe wear as are the bearing rollers 53 and 65 and it is practicable to adjust said rollers by eccentric adjustment of their shafts when assembling the machine and thereafter drilling holes through the reduced ends thereof and the thickened portions 79 of the rails to receive the pins 80, by which the said shafts are permanently fixed in place.

Referring now to the mechanism by which the cutting disk is fed to the work by manual or by power means the same is made as follows: Depending from the body of the carriage near its transverse center is a rack bar 85. The said rack bar meshes with a cogged wheel 86 which is driven from a horizontal feed shaft 87 arranged transversely of the carriage, through the medium of speed reducing pinions and gears 88, 89, 90, the shafts of which are carried by the brackets 91, 91 which are fixed to and depending from the bed plate 20. Said bed plate is provided with an opening through which said speed reducing gears extend. The feed shaft 87 extends laterally toward the right hand side of the machine and beyond the side wall 20ª of the hollow base, as best shown in Figs. 2 and 6, and is rotatively mounted in a bearing 97 attached to said base casting.

95 designates a hand feed wheel, the hub 96 of which is splined to the feed shaft 87 at a distance inwardly beyond its outer end. This connection affords means whereby the feed shaft may be positively turned by hand to feed the disk to its work, and permits the hand feed wheel to shift endwise of the shaft.

The power feeding mechanism comprises a worm wheel 98 which is loosely mounted on the feed shaft 87, and which meshes with a worm 99 fixed to the shaft 100 of a motor 101 that is attached in any suitable manner, as by means of a bracket 102, to the side of the bed plate frame. Said shaft 100 is rotatively mounted in bearings 103, 103, at the ends of the worm 99, which bearings are supported on a bracket 104 attached to the adjacent wall of the bed plate frame.

The hub 106 of the worm gear 98 is provided with a conical socket 107 to receive a conical extension 108 of the hub 96 of the hand feed wheel, the external and internal conical faces of the parts being correlated to constitute the members of a friction clutch whereby to connect the worm gear 98 to the feed shaft 87. Preferably, and as herein shown, one or both of the clutch members is lined with a suitable friction layer 109.

The clutch members are moved into and out of clutching relation by means of a sleeve nut 112 which is screw-threaded to the reduced screw-threaded end of the shaft 87. The said sleeve nut is provided at its inner end with a flange 113 which fits behind a ring 115 attached to the outer end of the feed wheel hub 96, as best shown in Fig. 6.

116 designates a collar which surrounds and is keyed to the sleeve nut 112 and is provided with a hand wheel 117 by which it may be rotated. By reason of the keyed relation of the collar and the sleeve nut 112, when said collar is rotated on its axis the sleeve nut is turned inwardly or outwardly, depending on the direction of rotation, so as to force the clutch members toward or draw them away from each other, as desired. A ring or washer 118 at the outer end of the feed shaft constitutes a stop to limit the outward movement of said wheel hub and clutch member carried thereby. Moreover, by reason of the interposition of the friction clutch between the gear 98 and the feed shaft, a slippage is provided which may temporarily release the power feed mechanism from the cutting disk upon occasion of the disk meeting the excessive resistance of an overload in the work, thereby temporarily relieving the disk from undue feed pressure.

When it is desired to operate the machine by hand, the hand wheel 117 is turned outwardly to release the clutch members from each other, and to thereby release the power feed from the shaft 87 so that said shaft may be rotated and the disk advanced to or retracted from the work through the medium of the hand wheel 95.

When the disk is to be fed to the work by power the clutch members of the hand feed wheel and worm gear are forced into coacting relation by turning the sleeve nut 112 inwardly. As herein shown, this action of the clutch to connect the motor to the carriage to advance the disk does not release the hand feed wheel from the disk feed mechanism, so that in the event the resistance to the feed of the disk becomes too great for the feed motor 101, the motor may be assisted by power applied through the hand feed wheel 95.

The worm gear 98 is held from endwise displacement on the feed shaft 87 by means of a flanged collar 120 which is pinned or otherwise secured to the shaft, the flange 121 of which fits into a recess in the inner end of the hub of the worm gear behind a shoulder formed by a ring 122 fixed to the inner end of said hub, as shown in Fig. 6. The said feed motor 101 is arrested at the forward limit of the feed movement of the carriage, and also at the rearward limit of the idle movement thereof, by tripping blocks 125, 126 (Figs. 2 and 3) which are slidably and adjustably mounted on a bar 127 attached to one side of the carriage. The blocks are adapted to be locked to the said bar 127 and to be held in adjusted positions thereon by thumb screws 128. The said tripping blocks are adapted to contact with the actuating lever 129, or a projection thereon, of a controller 130 of the motor 101 and thereby control the operation of the motor. The said controller actuating lever may be operated by hand through the medium of a hand lever 135 which is pivoted between its ends to a bracket 136 fixed in any suitable manner to the bed plate frame, and the hand lever is connected at one of its ends by a link or rod 137 to the said actuating lever 129 of the controller.

When the carriage is to be advanced to feed the disk to its work, the lever 135 is thrown forwardly thereby swinging the controller actuating lever rearwardly, as shown in Fig. 3. When the carriage reaches the limit of its forward travel, the tripping block 125 engages the controlling lever 129 to throw it to neutral position and thereby arrest the feed motor 101. To retract the carriage the lever 135 is swung rearwardly thereby throwing the controller lever forwardly. The motor then operates to retract the carriage until the tripping block 126 engages the controller lever 129 and throws it to neutral position to arrest the motor. The adjustment of said blocks 125, 126 on the bar 127 enables the carriage to be arrested at definite points at both limits of its movement.

The disk is partially inclosed by a hood 140 which comprises an inner fixed member 141 and an outer hinged member 142. The inner fixed member is attached in any suitable manner to the frame of the machine as by the bolts 147, and has a rim 143 over which the hinged member fits. The hinged member 142 is connected to the fixed member at the rear edge thereof by means of overlapping hinge lugs 149 and the hinge bolts 150 extending therethrough. The said hinged member or cover is locked in its closed position by means of suitable latches or keepers 152, 152 at the margins thereof. This construction of the hood permits the outer side thereof to be easily swung outwardly so as to afford free access to the disk for the purpose of replacing or repairing the same. The hood terminates at its lower side a distance above the work table 24 so as to afford free clearness for the work on the table.

Water or other cooling liquid is discharged on the peripheral portion of the disk to maintain the disk at a predetermined temperature by means of curved, perforated spray pipes 155, 155 within the hood, one at each side of the disk. The water is supplied to the spray pipes from any suitable source of water under pressure through a delivery pipe 158 and is controlled by a valve device, designated as a whole, by 160, to the inlet chamber 161 of which the delivery pipe 158 is connected. Between the said inlet chamber and the outlet chamber 162 of the valve is a valve disk 163 which engages a seat formed at the intersection of said chambers to cut off the flow of water to the valve. The stem 164 of said valve disk extends through and is guided in a suitable stuffing box at the outer end of the casing 165 which surrounds the inlet chamber 161. The valve disk is also provided with a guide stem 166 engaging a suitable guide socket in the casing. The outlet chamber 162 of the valve is connected to a nipple 167 which extends through the rim of the hood, and which is branched within the hood for connection with the spray pipes 155.

When the disk is advancing toward and through the work, the valve piece 163 is held away from its seat, against the action of a seating spring 170, by means of a suitable mechanism which is adapted to be tripped at the end of the feed cut of the disk to allow the valve to be closed by the action of the said seating spring 170. The mechanism herein shown for so holding the valve open is made as follows: Connected to the outer end of the valve stem 164 is a link 172 which extends transversely across the carriage and is connected at the right hand side of the machine to a lever 173 that is pivoted at 174 to the upstanding extension 175 of a bracket 176 fixed to the side of the upstanding bracket 30 of the carriage. 178 designates a vertically arranged lever that is pivoted at 179 to said bracket 176 to swing in a plane transverse to the plane of movement of the lever 173. The upper end of the said lever 178 carries a pin 180 which extends through a guide opening in the upstanding arm 175 of the bracket 176 and is rounded at its end to engage a socket 181 in the lever 173. A spring 183 acts against the pin 180 to urge it toward the notch 181 so that when the said socket is in line with the pin the lever 173 is locked in position to hold the valve piece 163 off its seat and to thereby permit the flow of cooling liquid to the spray pipes 155. This adjustment of the lever 173 with respect to the pin 180 may be effected by hand, and said pin is tripped out of engagement with the notched lever by mechanism made as follows: The lever 178 extends at its lower end to a point near the level of the bed plate 20 and carries at its said lower end a tripping pin 185 which extends in a direction parallel to the path of movement of the carriage. 186 designates an abutment against which the tripping pin 185 strikes when the carriage reaches the forward limit of its movement. The abutment 186 is herein shown as a yielding abutment, and is contained within a cylinder 188 suitably attached to the bed plate frame. It is backed by a spring 189 contained within the cylinder 188 and interposed between the abutment and a shoulder 190 at the outer end of the cylinder. Said shoulder comprises a plate to which is swiveled the inner end of an adjusting screw 191 which has screw-threaded engagement with the end wall of the cylinder, whereby the strength of the spring may be varied.

When the parts are in the positions shown in Fig. 7, the valve piece 163 is in its open position to permit the flow of cooling liquid to the spray pipes. The valve is thus held open during the forward feed movement of the disk carriage. When the carriage reaches the limit of the forward feed movement the tripping pin 185 engages the abutment 186 and swings the lever 178 in a manner to withdraw the pin 180 from the socket of the lever 173, thereupon the spring 170 presses the valve piece 163 to its seat and shuts off the supply of cooling liquid to the spray pipes.

When the disk is fed to the work by hand, the carriage is arrested at the limit of its feed movement by means of stop blocks 192, 192 fixed to the bed plate in the path of lugs or projections 193, 193 which depend from the rails 50, as best shown in Figs. 4 and 5. The spring 188 which backs the yielding abutment is of such strength that the lever 178 is tripped at the time the tripping pin 185 strikes the same when the carriage is moving forwardly under the action of the power feed mechanism. Such tripping of the cooling liquid valve mechanism occurs to cut off the delivery of the cooling fluid to the cutting disk at or about the time when the tripping block 125 engages the actuating lever 129 of the motor controller 130, whereby the delivery of the cooling fluid to the disk is cut off at or about the time the feed movement thereof is arrested. The said tripping block 125 is adjusted to arrest the carriage before the stop blocks 192 are engaged by the stop projections 193 of the rails 50, it being impracticable to arrest the motor feed by a fixed stop. The said fixed stop blocks are relied upon to finally arrest the carriage when it is fed by hand to prevent it being forced off of the bed plate, and the yielding abutment 186 permits of this additional movement of the carriage without placing the cooling liquid throwout trip device under strain. The provision of the adjustable tripping blocks permits the range of travel of the carriage to be varied to correspond to the dimensions of the work thereby avoiding unnecessary travel of the carriage.

The work table 24 is connected to the bed plate frame by means permitting it to be raised and lowered to accommodate work of different dimensions. As most clearly shown in Fig. 11, the said table is provided at its rear margin with hook shaped guide lugs 195, 195 which engage in suitable vertical guide grooves or recesses formed in the forward end of the bed plate frame by means of plates 196 which partially overlap said recesses, and said table has bearing at its central portion against an extended portion 197 of the bed plate frame. The work table thus guided is raised and lowered through the medium of an upstanding screw shaft 199 which is rotatively mounted at its upper and lower ends in bearings 200, 201, respectively. The said screw shaft engages between its ends a nut 202 that is rotatively mounted in, but held from endwise movement with respect to, a rearward lug or extension 203 of the work table. The said screw shaft 199 carries near its upper end a fixed worm gear 205 that meshes with a worm 206 fixed to a horizontal shaft 207 that is mounted in suitable bearings 208 in the bed plate frame (one bearing being shown in Fig. 11). Said shaft 207 extends at one end beyond the bed plate frame and is squared at 209 to receive a crank or other device for rotating it and to thereby raise and lower the work table. The said raising and lowering device obviously locks the work table in a given adjusted position. The work table is provided with any aproved form of work holder, designated as a whole by 212, by which the work is held on the table during the cutting operation.

Arranged at the left hand side of the machine, and in line with the cutting disk, is a trough 215 which is open at its top and front end, and into which the cutting disk passes when the carriage is retracted away from the work. Water from the cutting disk hood is drained into said trough, as by means of the inclined drain passage 216 (shown in full lines in Fig. 9 and in dotted lines in Fig. 1). Said trough is provided at its lower side with a drain pipe or outlet 217 through which the used water is drained from the trough and said drain pipe may discharge at a level above said drain opening to maintain a predetermined level of water therein.

The swinging member 142 of the cutting disk hood is provided in horizontal alinement with the open top of the trough with flanges 218, so shaped and of such size as to cover the open top of the trough when the carriage is in its retracted position and the hood is, therefore, abreast the trough. A cover plate 220 is provided to cover the open top of the trough when the saw is moving outwardly, and when it is in its outward position. The cover plate 220, shown best in Figs. 1 and 2, is supported on an upstanding flange 221 at the left hand side of the carriage 25, the said upstanding flange being fabricated to provide opposing guide grooves to receive the edges of guide flanges 222 at the inner edge of the cover plate 220, whereby the cover plate may be longitudinally shifted relatively to the carriage. The cover plate is detachably connected to the hood structure so as to be thereby movable with same, while permitting it to be detached therefrom, so that it may be slid backwardly away from the hood to permit the swinging member of the hood to be swung outwardly.

As herein shown the connection between the hood structure and cover plate is effected by providing the forward end of the cover plate 220 with an upstanding notched lug 225 adapted to receive a bolt 226 which is hinged to the hood structure, as most clearly shown in Fig. 1, to swing into and away from the notch of said lug. A thumb nut 227 screw-threaded to the bolt constitutes the connection between the cover plate and the hood structure to cause the cover plate to follow the hood structure during the outward or feeding movement of the cutting disk. The said cover plate is made of such length as to fully cover the trough when the disk is at the extreme limit of its movement. When the hinged member of the hood is to be swung open, the thumb nut is loosened and the bolt 226 swung upwardly, whereupon the cover plate may be readily forced rearwardly sufficiently to clear the swinging member of the hood when the latter is swung open.

The main or principal purpose of the tank 215 is the quenching of sparks generated by the passage of the disk through the work so as to prevent sparks being thrown backwardly away from the machine, such as would occur if the tank or other analogous inclosure were not present. The sparks are quenched by being thrown back into the tank or inclosure together with the cooling water thrown backwardly thereinto by the rapidly moving cutting disk. The tank also serves as a means to collect the cooling water and drain it away from the machine.

In order that the feed movement of the cutting disk, either by hand or by power, may be maintained substantially steady and without tendency to jumping or jerky movements, when the resistance of the passage of the disk through the work varies, I provide between the carriage and the bed plate frame a yielding steadying device, which in the present exemplification of my invention comprises a liquid check. The liquid check device is shown in Figs. 2, 3, 12 and 13, and is made as follows: 230 designates a cylinder which is fixed in any suitable manner to the carriage so as to move therewith, and 231 designates a piston within the cylinder attached to a piston rod 232 that is fixed to the bed plate frame, as by the lugs 233. The said cylinder is provided at its ends with ports 234, 235, herein shown as formed in the castings 236 by which the cylinder is attached to the carriage. The said ports 234, 235 are connected to the opposite ends of a by-pass 237, the terminals 238 of which extend through vertical openings in the carriage and communicate with the ports 234, 235. The by-pass pipe 237 is provided intermediate its ends with a loop 239, one member or side of which is provided with a check valve 240 and the other side with a hand controlled valve 241. The space of the fluid check system controlled by the parts described may be filled with a checking fluid at the tops of the terminals 238, the latter being equipped with plugs 242 to close the same. The check valve 240 is arranged to open in a direction to permit the checking fluid to flow freely therethrough when the carriage is moving rearwardly, that is to say, when the checking fluid in the cylinder at one side of the piston is passing outwardly through the port 235, inasmuch as in this direction of movement of the carriage the checking influence is not necessary, it being desirable to retract the saw as quickly as possible. When the carriage is moving toward the work the check valve 240 closes, so that the fluid displaced from one side of the piston to the other through the port 234 is by-passed through the valve 241, and this valve may be adjusted to regulate the flow of the fluid therethrough and thereby to check the speed of the cutting disk, as desired. Such a feed steadying device is especially useful in connection with a machine which employs as a feeding agent a form of energy which tends to accumulate or multiply its feeding force when the cutting disk encounters an unusual resistance in the work, and which, therefore, tends to accelerate the feed velocity when the resistance to the passage of the disk through the work is suddenly reduced, as when passing from a thicker to a thinner part of a beam or other work being operated upon. Air is an example of such a feeding agent, in that undue resistance to the advance of the cutting disk serves to compress the body of air and increase its pressure against the moving part on which it acts, so that when the resistance to the advance of the disk is reduced there is a tendency of the speed of the disk and carriage to be abruptly accelerated so as to cause them to jump forward. Should the disk meet an increased resistance immediately thereafter, as caused by passing into a thicker part of the work, an objectionable shock will be thrown on the disk tending to injure the same. An example of a feed device of this character is shown in my co-pending application for U. S. Letters Patent, No. 790,406, filed of even date herewith.

In order to prevent the sparks generated by the passage of the cutting disk through the work from being thrown backwardly into the space between the carriage and the bed plate, the said bed plate is provided at its forward end with an upstanding shield 245, best shown in Figs. 3, 12, and 13. The upper edge of said plate extends substantially to the lower level of the motor casing and to the overhanging portion of the carriage, so as to thereby prevent the passage of sparks to said space when the disk is passing through the work.

It will, of course, be understood that the motor 26 will be equipped with a suitable controller or starting box, the same having been omitted from the drawings for sake of clearness.

I claim as my invention:—

1. In a metal friction cutting machine, a frame, a carriage reciprocable thereon toward and from the work in a fixed horizontal path, a work support, means to actuate the carriage, a high speed motor and direct connected friction cutting disk, the carriage being formed with a massive front end having a forwardly facing motor supporting wall, and means for directly and fixedly attaching the motor to said wall in the manner of a wall mounting, whereby the motor and disk are rigidly supported on said carriage, and whereby a maximum fixed clearance is provided between the work support and the motor.

2. In a metal friction cutting machine, a frame, a carriage, horizontally reciprocable thereon toward and from the work, said carriage being provided with an upstanding portion having a forwardly facing motor supporting surface, a high speed motor directly and fixedly attached to said supporting surface of the carriage to overhang the work and provided with a shaft and a friction cutting disk connected directly to said shaft laterally beyond the carriage.

3. In a metal friction cutting machine, a frame, a work support, a carriage horizontally reciprocable on the frame toward and from the support, said carriage being provided at its front end above the bottom thereof with a forwardly extending portion to overhang the work support, and a high speed motor and direct connected friction cutting disk, with the motor directly and fixedly attached to the forward face of the overhanging portion of the carriage and the disk being of a diameter to extend rearwardly across the space beneath the overhanging portion of the carriage.

4. In a metal cutting machine, the combination with a work support, a high speed motor and its shaft, and a cutting disk directly supported on the shaft, with means for moving the motor and disk toward and from the work support, of clamping members on the shaft between which said disk is clamped, said members being relatively thicker at their margins to bear against the disk a distance radially from the axis thereof, one of the clamping members having tapered engagement with the shaft, and means to hold the tapered portions together and to press the clamping member upon said disk.

5. In a metal cutting machine, a work support, a high speed motor and direct connected cutting disk operatively associated with the work support and movable toward and from said support, a feed shaft operatively connected to the motor and cutting disk to move them toward and from the work support, a hand feed wheel fixed to said feed shaft by means permitting it to move endwise of the shaft, and power feed mechanism,—with means operatively associated with the movement of the hand wheel on the shaft for releasably connecting the power feed mechanism to said feed shaft.

6. In a metal cutting machine, a frame, a high speed motor and direct connected cutting disk guided by and reciprocable on the frame toward and away from the work, a feed shaft operatively connected to the motor and cutting disk to shift them toward and from the work, a hand feed wheel splined to said feed shaft, power feed mechanism for rotating said feed shaft, embracing a gear loosely mounted on said shaft, and clutch means carried in part by said hand wheel and in part by said gear to releasably lock the gear to said shaft.

7. In a metal cutting machine, a work support, a high speed motor and direct connected cutting disk operatively associated with the work support and movable toward and away from said support, a feed shaft operatively connected to the motor and cutting disk to shift them toward and from the work support, a hand feed wheel splined to said feed shaft, power feed mechanism for rotating said feed shaft, embracing a gear loosely mounted on said shaft, said gear and hand feed wheel being provided with co-acting clutch elements, and means for shifting said hand feed wheel axially of the shaft to clutch said gear to the shaft.

8. In a metal cutting machine, a work support, a high speed motor and direct connected cutting disk operatively associated with the work support and movable toward and away from said support, a feed shaft operatively connected to the motor and cutting disk to shift them toward and from the work support, a hand feed wheel splined to said feed shaft, a power feed mechanism for rotating said feed shaft, embracing a gear loosely mounted on said shaft, said gear and hand feed wheel being provided with co-acting clutch elements, and means for shifting said hand feed wheel axially of the shaft to clutch said gear to said shaft, comprising a nut screw-threaded to the shaft and having a swiveling connection with the hand feed wheel and a collar keyed to said nut and having manual means to rotate it.

9. In a metal cutting machine, a work support, a high speed motor and direct connected cutting disk operatively associated with the work support and movable toward and away from said support, a feed shaft operatively connected to the motor and cutting disk to shift them toward and from the work support, a gear loosely mounted on said shaft, a motor to rotate said gear and a hand feed wheel splined to the shaft to move endwise thereof, said worm gear having a tapered socket and the hub of the hand feed wheel having a tapered extension to fit therein to frictionally engage the walls of the socket to constitute a clutch to releasably lock the gear to the feed shaft, and means to move the hand feed wheel toward and from said gear.

10. In a metal cutting machine, a frame, a high speed motor and direct connected cutting disk guided by and supported on the frame, and movable toward and away from the work, power mechanism for feeding the motor and disk toward and retracting them from the work, manually operable means for also actuating the motor and disk, with means whereby the manual feed mechanism is operable independently of and in conjunction with the power feed mechanism, a controlling element for said power feed mechanism, and automatic tripping means operative at the limits of movement of the motor and disk for tripping said feed controlling element to arrest the feed and retractive movements of the disk.

11. In a metal cutting machine, a frame, a high speed motor and direct connected cutting disk guided by and supported on the frame and movable toward and away from the work, power mechanism for feeding the motor and disk toward and retracting them from the work, a controlling element for said power feed mechanism, automatic tripping means operative at the limits of movement of the motor and disk for tripping said feed controlling element to arrest the feed and retractive movements of the disk, and means to independently adjust said tripping means.

12. In a metal cutting machine, a work support, a carriage movable toward and from the work support, a high speed motor and direct connected cutting disk mounted on the carriage, a rack on the carriage, a rotative feed shaft, speed reducing gears connecting said shaft to said rack, a motor driven gear loosely mounted on said feed shaft, a hand wheel fixed non-rotatively to and slidable on said shaft, and clutch means operatively associated with said gear and with said hand feed wheel and actuable by movement of the hand wheel on the feed shaft for releasably locking the gear to said shaft.

13. A friction cutting machine comprising a frame, a carriage movable on the frame toward and from the work, a high speed motor and direct connected disk carried by the carriage, longitudinally arranged rails depending from the carriage, bearing rollers carried by said rails and traveling on upwardly facing tracks on the bed plate, other bearing rollers carried by said rails, other rails attached to the bed plate and having downwardly facing tracks against which the latter rollers bear, and horizontal rollers mounted in bearings carried by the latter rails and engaging laterally facing tracks on the first mentioned rails.

14. A friction cutting machine comprising a frame, a carriage movable on the frame toward and from the work, a high speed motor and direct connected cutting disk carried by the carriage, two sets of bearing rollers mounted on the carriage, and parallel upwardly and downwardly facing tracks carried by the frame, each adapted for rolling engagement by one set of said bearing rollers.

15. A friction cutting machine comprising a frame, a carriage movable on the frame toward and from the work, a high speed motor and direct connected cutting disk carried by the carriage, two sets of bearing rollers mounted on the carriage, parallel upwardly and downwardly facing tracks carried by the frame, each adapted for rolling engagement by one set of said bearing rollers, and horizontal rollers mounted on the frame and having rolling engagement with laterally facing tracks on the carriage.

16. A friction cutting machine comprising a frame, a carriage movable on the frame toward and from the work, a high speed motor and direct connected cutting disk carried by the carriage, two sets of bearing rollers mounted on the carriage, parallel upwardly and downwardly facing tracks carried by the frame, each adapted for rolling engagement by one set of said bearing rollers, the set of bearing rollers which engage the downwardly facing tracks being made of less diameter than the other set.

17. A friction cutting machine comprising a frame, a carriage movable on the frame toward and from the work, a high speed motor and direct connected cutting disk carried by the carriage, a longitudinally arranged rail attached to and depending from the carriage, a downholding rail attached to the bed frame at one side of said carriage rail and provided with a downwardly facing track, and two sets of rollers mounted on the carriage rail, the rollers of the two sets being alternately arranged, one set of rollers engaging said downwardly facing track and the other set engaging an upwardly facing track on said frame.

18. A friction cutting machine comprising a frame, a carriage movable on the frame toward and from the work, a high speed motor and direct connected disk carried by the carriage, a longitudinally arranged rail attached to and depending from the carriage, a downholding rail attached to the frame at one side of said carriage rail and provided with a downwardly facing track, two sets of rollers mounted on the carriage rail, the rollers of the two sets being alternately arranged, one set of rollers engaging said downwardly facing track and the other set engaging an upwardly facing track on said frame, and means to adjust said bearing rollers toward and from their tracks 19. A friction cutting machine comprising a frame, a carriage movable on the frame toward and from the work, a high speed motor and direct connected cutting disk carried by the carriage, a longitudinally arranged rail attached to and depending from the carriage, a downholding rail attached to the frame at one side of said carriage rail and provided with a downwardly facing track, two sets of rollers mounted on the carriage rail, the rollers of the two sets being alternately arranged, one set engaging said downwardly facing track and the other set engaging an upwardly facing track on said frame, and a third set of rollers mounted on the upper edge of the frame rail and traveling along a laterally facing track on the carriage rail.

20. A friction cutting machine comprising a frame, a carriage movable on the frame toward and from the work, a high speed motor and direct connected disk carried by the carriage, a longitudinally arranged rail attached to and depending from the carriage, a downholding rail attached to the bed frame at one side of said carriage rail and provided with a downwardly facing track, two sets of rollers mounted on the carriage rail, the rollers of the two sets being alternately arranged, one set of rollers engaging said downwardly facing track and the other set engaging an upwardly facing track on said frame, and a stop on the carriage rail to engage a stop on the frame to limit the ultimate feed movement of the carriage.

21. In a metal cutting machine the combination with a frame, a cutting disk and driving motor therefor movable on and guided by the frame toward and away from the work, of combined power and hand feed mechanism for feeding the cutting disk toward the work, a fixed stop to arrest the hand feed movement of the cutting disk, and automatic means to arrest the power feed movement of the disk arranged to arrest the disk in advance of the action of said fixed stop 22. In a metal cutting machine, a frame, a high speed motor and direct connected cutting disk movable on said frame and guided thereby toward and away from the work support, a spray pipe to discharge a cooling liquid on the disk during the cutting operation, with valved means to control the supply of cooling liquid to the said pipe, and tripping means operative at the limit of the cutting movement of the disk to automatically shut off the cooling liquid to the spray pipe.

23. In a metal cutting machine, a work support, a high speed motor and direct connected cutting disk operatively connected with and movable toward and away from the work support, a spray pipe to discharge a cooling liquid on the disk during the cutting movement thereof, a supply pipe connected to the spray pipe and provided with a controlling valve, a swinging lever connected to said valve, a swinging locking lever having means to act on the first lever to hold the valve open, and tripping means adapted to engage said locking lever at the limit of the cutting movement of the disk to permit the valve to close.

24. In a friction cutting machine the combination with a work support and a high speed friction disk and driving motor therefor operatively associated with and movable toward and from the work support, of valve controlled means for delivering a cooling liquid to the disk, and controlling means for the valve comprising a swinging lever connected to the valve and provided with a notch, a tripping lever carrying at one end a pin to engage said notch to lock the valve in its open position and a stop associated with the other end of said lever to release said pin from said notch.

25. In a metal cutting machine the combination with a frame, a cutting disk and a driving motor therefor movable on and guided by the frame toward and away from the work, of combined power and hand feed mechanism for feeding the cutting disk toward the work, a fixed stop to arrest the hand feed movement of the cutting disk, automatic means to arrest the power feed movement of the disk in advance of said stop, valve controlled means to supply a cooling liquid to the disk during the cutting movement thereof, and means acting on the controlling valve for cutting off the cooling liquid to the disk, embracing tripping means to actuate the same to close said valve in advance of the action of said stop to arrest the cutting disk.

26. In a metal cutting machine, the combination with a frame, a cutting disk and a driving motor therefor movable on and guided by the frame toward and from the work, of combined power and hand feed mechanism for feeding the cutting disks toward the work, a stop on the bed plate to arrest the hand feed movement of the cutting disk, automatic means to arrest the power feed movement of the disk in advance of said stop, valve controlled means to supply a cooling liquid to the disk during the cutting movement thereof, and means acting on the controlling valve for cutting off the cooling liquid to the disk, embracing a tripping lever associated with the cooling liquid controlling valve and a yielding abutment on the frame arranged for contact with the tripping lever when the disk is automatically arrested, while permitting the lever to advance, under the action of the hand feed mechanism, beyond the automatic stop position.

27. In a friction cutting machine, the combination with a frame, a carriage movable thereon toward and from the work, and a motor and operatively connected cutting disk carried by the carriage, of a hood to partially inclose the disk, and a fixed tank in rear of the disk to receive and quench the sparks thrown backwardly from the disk, and having a slotted top and front and a sliding closure to cover the top slotted portion of the tank, detachably connected to the hood and movable therewith.

28. In a friction cutting machine, the combination with a frame, a carriage movable thereon toward and from the work, and a motor and operatively connected cutting disk carried by the carriage, of a hood to partially inclose the disk, means to deliver a cooling liquid to the disk, and a fixed inclosure in rear of the disk to receive the sparks and cooling liquid thrown backwardly from the disk to thereby quench the sparks, said inclosure being slotted at its top to permit the disk to move backwardly therein and a closure for said top movable with said disk.

29. In a friction cutting machine, the combination with a frame, a carriage movable thereon toward and from the work, and a motor and operatively connected cutting disk carried by the carriage, of a hood to partially inclose the disk, and a fixed forwardly and upwardly open inclosure in line with the cutting disk and hood, said hood being flanged to close the open top of the inclosure when the carriage is in its retracted position.

30. In a friction cutting machine, the combination with a frame, a carriage movable thereon toward and from the work, and a motor and operatively connected cutting disk carried by the carriage, of a hood to partially inclose the disk, a fixed forwardly and upwardly open inclosure in line with the cutting disk and hood, said hood being flanged to close the open top of the inclosure when the carriage is in its retracted position and a cover plate connected to and trailing behind the hood to close the open top of the inclosure when the carriage is in its forward position.

31. In a friction cutting machine, the combination with a bed plate, a carriage movable thereon toward and from the work, and a motor and operatively connected cutting disk carried by the carriage, of a hood to partially inclose the disk, a tank in line with the cutting disk and open at its front and top, said hood being flanged to close the open top of the tank when the carriage is in its retracted position, and a cover plate detachably connected to the hood and normally movable therewith to cover the tank when the carriage is in its forward position, and adapted to be shifted away from the hood when detached therefrom.

32. In a friction cutting machine, the combination with a frame, a carriage movable thereon toward and from the work and a friction disk mounted on the carriage with means to drive it, of a hood partially inclosing the disk comprising an inner stationary member and an outer laterally swinging member, a tank in line with the friction disk and open at its front and top and a cover plate for said tank detachably fitted to the hood whereby said plate may be shifted away from the hood preparatory to opening the swinging member of the hood.

33. A metal cutting machine comprising a frame, a carriage movable thereon toward and from the work, with anti-friction bearings between the same, a motor fixed to and having an overhanging mounting at the front of the carriage, with a cutting disk connected directly thereto, and a shield extending upwardly from the frame toward the motor to close the space between the front of the carriage and frame to prevent the passage of sparks to said space.

34. In a metal cutting machine, a work support, a high speed motor and direct connected cutting disk operatively connected with and movable toward and from the work support, means for imparting feed movement to said motor and disk, and checking means acting with a predetermined force to steady the feed movement of the disk regardless of the work resistance against which the disk acts.

35. In a metal cutting machine, a work support, a high speed motor and direct connected cutting disk operatively connected with and movable toward and from the work support, means for imparting feed movement to said motor and disk and a fluid check to steady the feed movement of the disk comprising a cylinder and a piston, one of which is fixed and the other of which is movable with the motor and disk, and a regulable by-pass communicating with the cylinder on opposite sides of the piston.

36. In a metal cutting machine, a work support, a high speed motor and direct connected cutting disk operatively connected with and movable toward and from the work support, means for imparting feed movement to said motor and disk and a fluid check to steady the feed movement of the disk comprising a cylinder and piston, one of which is fixed and the other of which is movable with the motor and disk, a by-pass pipe communicating with the cylinder on opposite sides of the piston and provided with a loop, a check valve controlling one member of the loop, and a regulating valve controlling the other member of the loop.

37. In a metal friction cutting machine, a horizontally reciprocable carriage movable toward and from the work and provided at its front end with a wide deep motor supporting face, a high speed motor and direct connected friction cutting disk, the casing of said motor having a wide and deep flanged rear portion to bear against said face and fastening means extending through the flanged casing and into the carriage to rigidly affix the motor to said carriage.

In testimony that I claim the foregoing as my invention I affix my signature in the presence of two witnesses, this 5th day of September, A. D. 1913.

EDWARD T. HENDEE.

Witnesses:
E. M. JANS,
W. L. HALL.